United States Patent [19]

Wynens

[11] Patent Number: 4,728,112
[45] Date of Patent: Mar. 1, 1988

[54] TANDEM TWO SEAT CHILD'S STROLLER

[76] Inventor: Barbara M. Wynens, 4195 Wellington Hills Dr., Snellville, Ga. 30278

[21] Appl. No.: 947,173

[22] Filed: Dec. 29, 1986

[51] Int. Cl.⁴ .......................... B62B 7/00; B62B 9/28
[52] U.S. Cl. ................................... 280/47.4; 297/244
[58] Field of Search ............... 280/289 WC, 642, 644, 280/647, 650, 658, 87.02 R, 87.02 W, 47.34, 47.35, 47.4, 47.38; 297/232, 243, 244

[56] References Cited

U.S. PATENT DOCUMENTS 3,309,101  2/1965  Romay .......................... 280/47.38

Primary Examiner—John J. Love
Assistant Examiner—Richard Camby
Attorney, Agent, or Firm—James A. Hinkle

[57] ABSTRACT

A tandem two seat child's stroller made of tubular material having an elongated frame supporting two tandemly related seats for small children with the lower front seat and the upper rear seat being vertically disposed to one another, wherein the front seat faces toward the forward portion of the stroller and the upper rear seat faces toward the rear of the stroller. A maneuvering handle is provided at the rear of the stroller and a removable container doubling as a foot support is provided on the lower part of the stroller for containing packages and personal articles.

4 Claims, 4 Drawing Figures

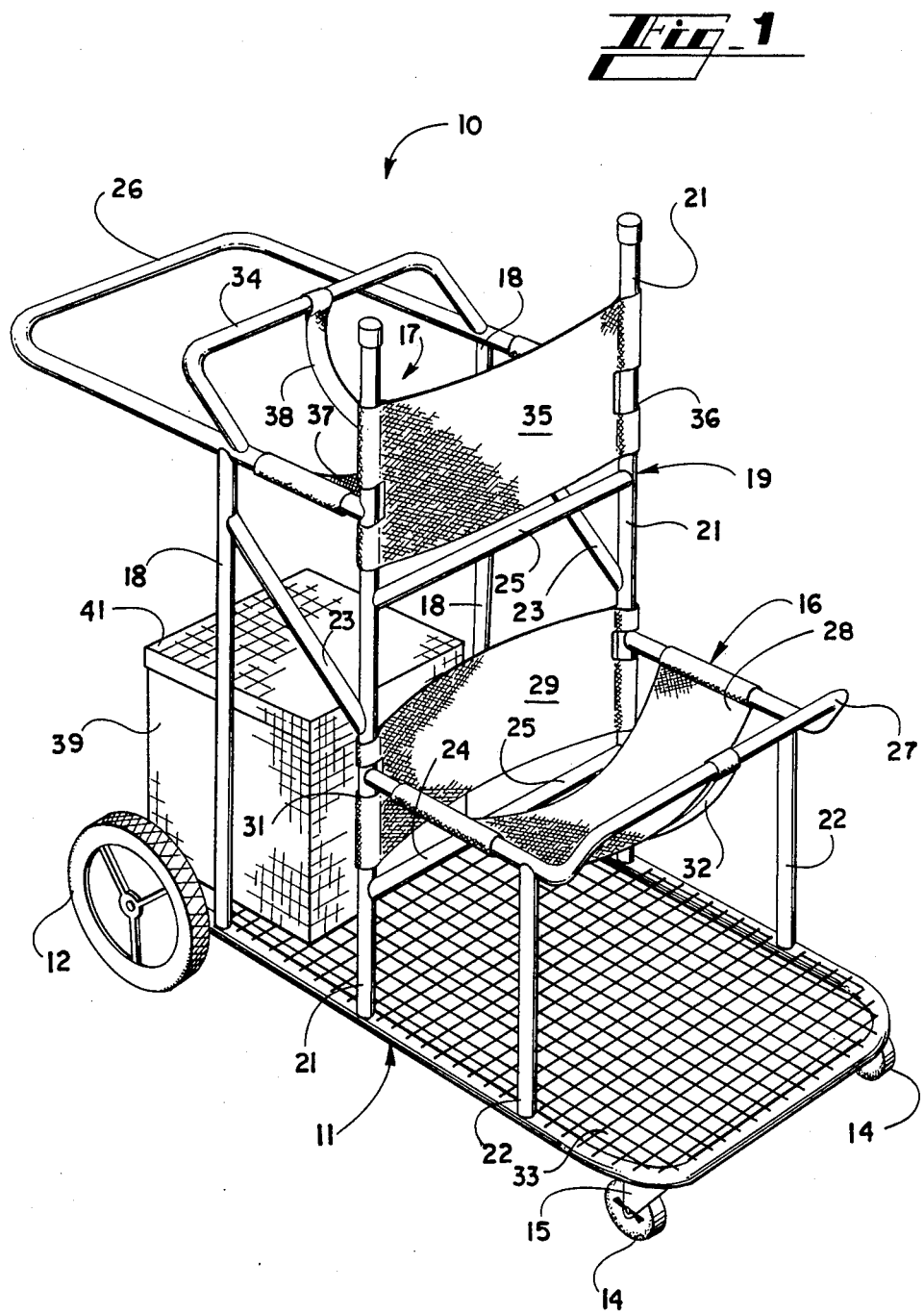
Fig_1

U.S. Patent  Mar. 1, 1988  Sheet 2 of 2  4,728,112
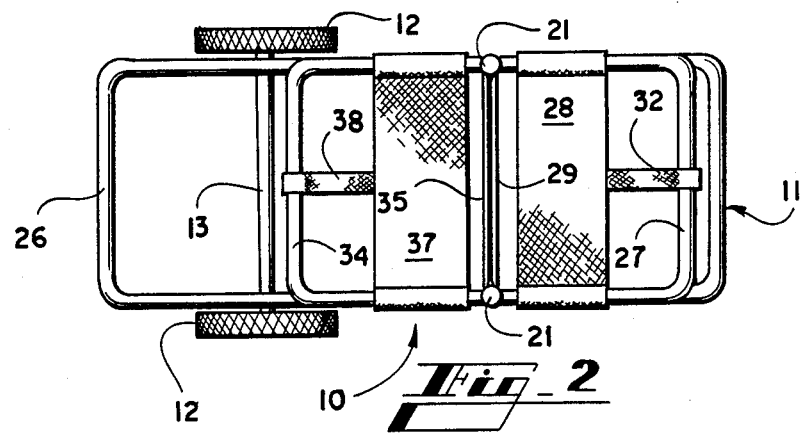
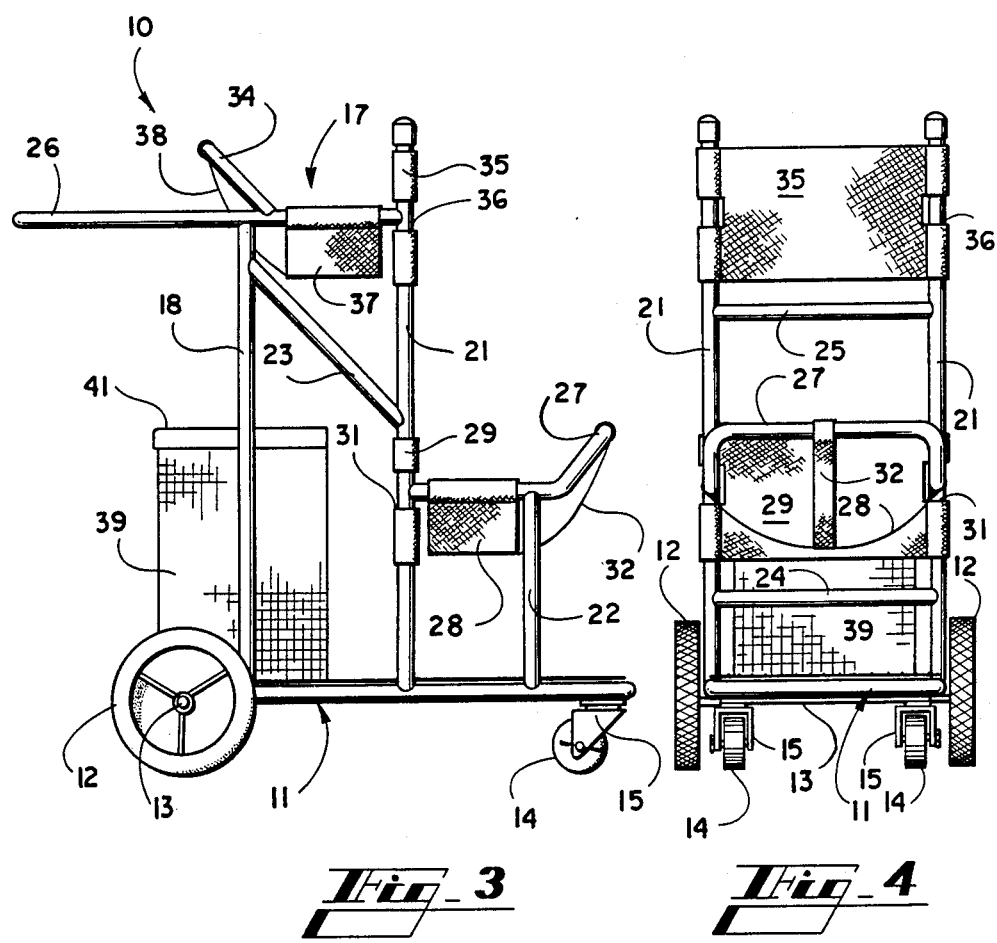

TANDEM TWO SEAT CHILD'S STROLLER

BACKGROUND OF THE INVENTION

I. Field of the Invention

The present invention relates to a stroller for use with children and more particularly to a stroller which is designed to be utilized for two children at the same time, wherein the two seats for the respective children are tandemly mounted fore and aft along the center line of the stroller with one seat facing forward and the other seat facing rearwardly, and each seat being spaced vertically with respect to the other.

II. Description of the Related Art

In the past, a great number of children's strollers have found their way onto the market and generally these strollers are of tubular metal construction with provision for one or more children to be seated therein. The most common seating arrangement is to have the child sitting in the stroller facing forward or in the case of a dual seated stroller, the children are normally seated side-by-side facing forward. However, this poses a problem in the case of the two seated stroller since if the children are seated side-by-side, the width of the stroller becomes very unwieldy in tight spaces or in shopping areas where pedestrian traffic or construction dictate tight spaces.

In addition, the dual seated strollers of the prior art are extremely complicated and require a mechanism of some sort associated with the stroller to fold it to a configuration which is easily transportable. In addition to being of large size, the strollers of the prior art are generally cumbersome and weigh a considerable amount, which also makes these strollers difficult to maneuver and to transport.

SUMMARY OF THE INVENTION

The present invention provides a tandem two-seat child's stroller which is of compact design, is of light weight, and can be manufactured quite easily at relatively low cost. In addition, the present stroller is durable and is extremely safe in normal use.

The stroller of the preferred embodiment provides for an elongated upright frame structure of tandem seat design wherein the front child's seat faces forwardly and the rear child's seat faces rearwardly, with the rear seat being elevated with respect to the front seat. The tubular seat support frame for each seat is of a common structure to the two seats, wherein the seat backs of each seat is attached to the common support frame to provide for economy in manufacture. The tubular base support frame provides for a mesh flooring member which doubles as a foot support for the lower seat and in the rear thereof, there is provided a container of preferably mesh construction which doubles as a foot support for the rear seat and, to provide storage capacity on the stroller for packages and other small articles.

The present stroller as described herein is of very light weight and because of its tandem fore and aft seating arrangement, provides a narrow profile along its elongated length so that the user may have ease of mobility in negotiating sharp turns and narrow spaces in public places.

Other objects, advantages and capabilities of the invention will become apparent from the following description, taken in conjunction with the accompanying drawings showing only a preferred embodiment of the invention.

BRIEF DESCRIPTION OF THE DRAWINGS

FIG. 1 is an overall perspective view of the child's stroller of the present invention;

FIG. 2 is a top plan view of the stroller;

FIG. 3 is a side elevation view; and

FIG. 4 is front elevation view of the child's stroller of the present invention.

DESCRIPTION OF THE PREFERRED EMBODIMENT

Referring to the drawings wherein like reference characters designate corresponding parts throughout the several figures, the tandem two seat child's stroller of the present invention is indicated by the numeral 10. Comprising the stroller 10 is a generally rectangular tubular base support frame 11 to which there is affixed a pair of rear main wheels 12 interconnected and affixed to the stroller by means of a rear axle 13. The rear axle 13 is secured to the tubular base support frame 11 by any suitable means well known in the art. In the forward portion of the support frame 11, there is a pair of swivel action front wheels 14 attached to the support frame 11 by means of generally U-shaped wheel mounting brackets 15 suitably swiveled to the base support frame 11.

Positioned vertically from the base support frame 11, is a lower seat and an upper seat respectively indicated generally by numerals 16 and 17. Supporting the upper and lower seats to the base support frame 11, are a pair of rear main support members 18, a tubular seat support frame 19, which includes a pair of upward seat support members 21, and a pair of front main support members 22.

To properly brace and interconnect the rear main support members 18, the tubular seat support frame 19, and the front main support members 22, are respective pairs of rear angle braces 23 and forward angle braces 24. Providing lateral bracing to the tubular seat support frame 19, are a pair of cross-braces 25 interconnected between the vertical seat support members 21.

Attached to the rear main support members 18 is a generally U-shaped maneuvering handle 26 which may, by preference, be so situated as to be parallel to the tubular base support frame 11 and the surface upon which the stroller is to be rolled.

The lower seat 16 generally comprises a lower seat support frame 27 which extends from one seat support member 21 around in a U-shaped configuration to the other seat support member 21 and is held in proper alignment by the front main support members 22. The lower seat itself comprises a lower saddle seat 28 and a lower seat back 29 as can be easily seen from the drawings, and especially in FIG. 1. The lower seat back 29 is attached around each seat support member 21 and has a cutout portion 31 which is designed to allow the seat back material to be affixed to the seat support member 21 and fit around the lower seat support frame 27 where it intersects with the seat support member 21. The saddle seat 28 is affixed around the lower seat support frame 27 in a loosely-fitted configuration to allow a comfortable seating arrangement for the child. The front portion of the seat 28 is then attached to the lower seat support frame 27 in its forward-most position by the lower seat frontal support strap 32.

The general purpose of the strap 32 is to provide means for maintaining the child in the seat 28 so that the child does not fall forward through the seat onto the mesh flooring member 33, which also doubles as a support for the lower seat 16. As is obvious, the lower seat back 29 provides support for the back of the child as the child sits in the seat 16.

The upper seat 17, much like the lower seat, comprises an upper seat support frame 34, which interconnects to the seat support member 21 as illustrated in the figures, and much in the same manner as the lower seat support frame 27. The upper seat also includes an upper seat back 35 of suitable material attached to the seat support members 21, with cutout portions 36 to allow the upper support frame 34 to attach, as shown, to the seat support members 21.

The upper saddle seat portion is of suitable material and is indicated by numeral 37, wherein the material is suitably attached around the upper seat support frame 34 in the same manner as shown in the lower seat. Similarly, the upper seat frontal support strap 38 runs from the forward edge of the seat 37 in a loose configuration and attaches to the forward edge of the upper seat support frame 34, and like in the lower seat 16, strap 38 secures the child in the seat and prevents the child from falling through the opening in front of the seat.

Since it is quite probable, when utilizing a stroller to effect transportation of small children, the user would like to have room for storage of personal effects and packages, there is provided loosely attached to the mesh flooring 33, a container 39, having a removable or hinged cover 41. It is anticipated that the size of the container would be sufficient so as to provide a convenient foot support for the child sitting in the upper seat 17.

It is to be noted that the materials used in manufacture of the stroller 10 may be of many varieties, including tubular aluminum or even molded plastic tubing. The rest of the materials utilized in the stroller should be obvious to anyone skilled in the art and are common materials used in everyday commerce.

While I have particularly shown and described one particular embodiment of the invention, it is distinctly understood that the invention is not limited thereto, but that modifications may be made within the scope of the invention and such variations as are covered by the scope of the appended claims.

What is claimed is:

1. A stroller for children comprising a forward portion and a rearward portion,
   a generally rectangular frame having a longitudinal axis along a centerline transversing the major length direction of the rectangular frame,
   rear wheel means integral with the frame at the rearward portion,
   front wheel means integral with the frame at the forward portion,
   a vertically disposed support frame having a pair of spaced apart upstanding support legs attached to the rectangular frame,
   flooring means overlying the rectangular frame,
   a first lower forward facing seat means affixed to the rectangular frame,
     the first lower seat means including a generally U-shaped seat support frame,
       a flexible saddle seat attached to each opposed leg of the support frame and a frontal seat strap attached to the forward edge of the saddle seat and to the connecting leg of the lower seat support frame,
       a flexible lower seat back having opposed ends attached to the respective spaced apart upstanding legs of the vertically disposed support frame, thereby forming a seat back for the first lower forward facing seat means,
   a second raised rearward facing seat means affixed to the rectangular frame,
     the second raised seat means including a generally U-shaped seat support frame,
       a flexible saddle seat attached to each opposed leg of the support frame and a frontal seat strap attached to the forward edge of the saddle seat and to the connecting leg of the lower seat support frame,
       a flexible lower seat back having opposed ends attached to the respective spaced apart upstanding legs of the vertically disposed support frame, thereby forming a seat back for said second rearward seat means,
         said second seat means being mounted vertically and rearwardly of the first seat means and facing toward the rearward portion of the stroller,
   a vertically disposed support frame being the common support member for a portion of both the first and second seat means, said support member comprising a pair of spaced apart upstanding legs,
   a substantially U-shaped handle means affixed to the second seat means,
   a container means removably positioned to the flooring means on the rearward portion thereof wherein said flooring means comprises an open-weave mesh material, and
   said container means including a selectively removable access lid that provides flooring means for the second seat means.

2. The stroller as claimed in claim 1, wherein the front wheel means are so mounted to said frame as to be capable of swivel movement with respect to the longitudinal axis of the frame so as to provide directional control to the stroller.

3. The stroller as claimed in claim 2, wherein the vertically disposed support frame which is the common support member for the seat backs of both the first and second seat means is perpendicular to the longitudinal axis of the frame, said upstanding legs of said support member being equally distant from said longitudinal axis, thereby placing each seat means centered over said longitudinal axis.

4. A stroller for children comprising a forward portion and a rearward portion,
   a generally rectangular frame having a longitudinal axis along a centerline transversing the major length direction of the rectangular frame.
   rear wheel means integral with the frame at the rearward portion,
   front wheel means integral with the frame at the forward portion,
   a vertically disposed support frame having a pair of spaced apart upstanding support legs attached to the rectangular frame,
     said vertically disposed support frame having an upper end and a lower end, said support member being affixed to the rectangular frame perpendicularly to the longitudinal axis of said frame and perpendicularly to the plane of the frame, flooring means overlying the rectangular frame,
a first lower forward facing seat means affixed to the rectangular frame,
  the first lower seat means including a generally U-shaped seat support frame,
    a flexible saddle seat attached to each opposed leg of the support frame and a frontal seat strap attached to the forward edge of the saddle seat and to the connecting leg of the lower seat support frame,
    a flexible lower seat back having opposed ends attached to the respective spaced apart upstanding legs of the vertically disposed support frame, thereby forming a seat back for the first lower forward facing seat means,
a second raised rearward facing seat means affixed to the rectangular frame,
  the second raised seat means including a generally U-shaped seat support frame,
    a flexible saddle seat attached to each opposed leg of the support frame and a frontal seat strap attached to the forward edge of the saddle seat and to the connecting leg of the lower seat support frame,
    a flexible lower seat back having opposed ends attached to the respective spaced apart upstanding legs of the vertically disposed support frame, thereby forming a seat back for said second rearward seat means,
    said second seat means being mounted vertically and rearwardly of the first seat means and facing toward the rearward portion of the stroller,
a vertically disposed support frame being the common support member for a portion of both the first and second seat means, said support member comprising a pair of spaced apart upstanding legs,
a substantially U-shaped handle means affixed to the second seat means,
  said handle means having its ends affixed to respective opposed legs of the seat support frame wherein said handle means is positionally disposed in a horizontal plane which is parallel to the plane of the rectangular frame,
a container means removably positioned to the flooring means on the rearward portion thereof wherein said flooring means comprises an open-weave mesh material, and
said container means including a selectively removable access lid that provides flooring means for the second seat means.

* * * * *